(12) United States Patent
Komenda et al.

(10) Patent No.: US 9,990,668 B2
(45) Date of Patent: *Jun. 5, 2018

(54) SYSTEM AND METHOD FOR INTELLIGENT ORDERING BETWEEN A USER AND MULTIPLE PROVIDERS

(71) Applicant: 2POINTB, LLC, Glendale, AZ (US)

(72) Inventors: Joshua Benjamin Komenda, San Diego, CA (US); Jeremy Schrage, San Diego, CA (US)

(73) Assignee: 2POINTB, LLC., Glendale, AZ (US)

( * ) Notice: Subject to any disclaimer, the term of this patent is extended or adjusted under 35 U.S.C. 154(b) by 468 days.

This patent is subject to a terminal disclaimer.

(21) Appl. No.: 14/697,588

(22) Filed: Apr. 27, 2015

(65) Prior Publication Data

US 2015/0242936 A1 Aug. 27, 2015

Related U.S. Application Data

(63) Continuation of application No. 12/180,516, filed on Jul. 26, 2008, now Pat. No. 9,020,842.

(60) Provisional application No. 60/952,249, filed on Jul. 27, 2007.

(51) Int. Cl.
G06Q 30/06 (2012.01)
G06F 17/24 (2006.01)

(52) U.S. Cl.
CPC ....... *G06Q 30/0635* (2013.01); *G06F 17/243* (2013.01); *G06Q 30/0603* (2013.01); *G06Q 30/0633* (2013.01)

(58) Field of Classification Search
CPC .................. G06Q 30/0601–30/0645
USPC ................................ 705/26.1–27.2
See application file for complete search history.

(56) References Cited

U.S. PATENT DOCUMENTS

| 6,356,838 | B1 | 3/2002 | Paul |
| 7,110,973 | B1 | 9/2006 | Goldstein et al. |
| 7,366,684 | B1 | 4/2008 | Douglas |
| 9,020,842 | B2 | 4/2015 | Komenda et al. |

(Continued)

FOREIGN PATENT DOCUMENTS

| EP | 1091311 A | 4/2001 |
| WO | 0154033 A | 7/2001 |

(Continued)

OTHER PUBLICATIONS 1-800-Taxicab goes live with a national taxicab solution. (Oct. 23, 2000). Business Wire Retrieved from https://dialog.proquest.com/professional/docview/672915517?accountid=142257.*

(Continued)

*Primary Examiner* — Resha Desai

(74) *Attorney, Agent, or Firm* — The Mueller Law Office, P.C.

(57) ABSTRACT

The present invention provides a computer system and method for facilitating a transaction between a buyer and a seller. The seller is one of multiple available providers of a product and/or service. Initially, the buyer sends out an order, and the order is automatically verified. A seller is then determined based on at least one desirable characteristic of that particular seller. Then, the order is automatically translated into a format understandable by the desired seller. The order is communicated to the desired seller and the status of the order is later communicated to the buyer.

18 Claims, 10 Drawing Sheets

(56) References Cited

U.S. PATENT DOCUMENTS

| | | | |
|---|---|---|---|
| 2001/0056396 A1 | 12/2001 | Goino | |
| 2002/0013731 A1* | 1/2002 | Bright | G06Q 10/087 705/22 |
| 2002/0077876 A1 | 6/2002 | O'Meara et al. | |
| 2004/0117332 A1* | 6/2004 | Himebaugh | G06Q 10/02 705/417 |
| 2004/0139204 A1* | 7/2004 | Ergezinger | G06Q 30/0601 709/229 |
| 2005/0246240 A1 | 11/2005 | Padilla | |
| 2009/0030885 A1 | 1/2009 | Depasquale et al. | |

FOREIGN PATENT DOCUMENTS

| | | |
|---|---|---|
| WO | 03017173 A | 2/2003 |
| WO | 2008006595 A | 1/2008 |

OTHER PUBLICATIONS

Bruce, "But can it take a stone out of a horse's hoof?" The Scotsman, Jan. 17, 2000, Retrieved from http://search.proquest.com/docview/326761743?accountid=14753.

How it Works, SMSCAB, Accessed on Jul. 8, 2008, http://www.smscab.net/howitworks.htm.

Order Food on Your Cell Phone, GoCelly, Accessed Online on Jul. 11, 2008, http://www.gocelly.com/.

Papa John's Short Message Service (SMS)/ Text Messaging Information Center, Papa Johns, Accessed on Jul. 11, 2008, http://www.papjohns.com/sms/.

SMSCAB—A Brooklyn based, text-based car service, SMS Cab, Accessed on Jul. 8, 2008, http://www.smscab.net/1.

Written Opinion of the International Searching Authority dated Feb. 11, 2010, PCT application No. PCT/US2008/071271 filed on Jul. 25, 2008.

* cited by examiner

SYSTEM AND METHOD FOR INTELLIGENT ORDERING BETWEEN A USER AND MULTIPLE PROVIDERS

CROSS-REFERENCE TO RELATED APPLICATIONS

This application is a continuation of U.S. application Ser. No. 12/180,516, filed Jul. 26, 2008, which claims priority to U.S. Provisional Application No. 60/952,249, filed Jul. 27, 2007, both of which are hereby incorporated by reference as if set forth in full in this application for all purposes.

RELATED APPLICATIONS

This application claims priority to U.S. Provisional Patent Application Ser. No. 60/952,249 filed on Jul. 27, 2007 entitled "System and Method of Intelligent Ordering Across Multiple Providers," which is hereby incorporated by reference as if set forth in full in this application for all purposes.

FIELD OF THE INVENTION

The present invention relates generally to electronic commerce systems, and, more particularly, to a computer based system for facilitating transactions between buyers and sellers.

BACKGROUND OF THE INVENTION

Sales of goods and services are typically made using traditional ordering techniques. For instance, a potential buyer reviews goods or services from multiple providers, and then the potential buyer places an order based on a particular seller's quality, price, location or the like. One known method for ordering a product or service is initiating the process by electronic means, such as a text message.

Many of these systems require that certain preferences be predetermined. For example, if a customer desires a taxi, the customer can electronically contact the taxi company with a predetermined destination such as "home". The drawback in the current example is that the customer cannot choose a new location during the ordering process other than one which was predetermined and already provided to the taxi company. In another example, food may be ordered in a similar manner. The customer may set up a profile with the food provider. Later, when the customer wants to electronically order the food, electronic contact is made, and the preset order is processed.

Typically when a customer sends an order for a particular product or service, the order is sent directly to the company as the provider. In an example such as this, a customer desires a taxi; the customer sends a request to a particular taxi company for a car. The operator then will make a determination as to the best taxi for the customer based upon their particular fleet. The drawback to this method is that the customer is limited to the single, particular taxi company which may not have the best available taxi available for that customer as compared to a competitor. If a customer wants to pick from multiple taxi companies, then the customer must know contact information for all different providers and must contact them individually. Another drawback for this system is that there must be an operator involved; therefore the system requires the cost of an operator to make the decision and communicate to the taxi driver.

A system choosing from multiple providers may also involve a call center or operator who chooses a provider for the customer's request. For example, a customer desires a tow truck and sends an electronic message to a towing service. The towing service then uses a call center to call various operators of tow trucks to find which truck can respond. The drawback of this system is the need for additional labor to make phone calls, and the potential for the address to be not communicated clearly to the different tow truck drivers depending on the person making the call and the person receiving the call.

A common method of allocating the location for the product or service to be delivered involves locating the customer's address based on the GPS unit on the mobile phone. In an example such as this, a taxi driver would be dispatched to the location where the customer is currently located once the request for service is sent. The drawback in this system is that the customer may not want to have the taxi in that current location. The customer could desire for the taxi to be waiting at a later time or at a different location. In a similar example, a customer may order some goods to be delivered to a particular location and not want them sent to where the customer is located based on a GPS system. Systems using a GPS as a locator cannot handle this type of request.

A practice in electronic text messaging or an SMS based system involves using abbreviations or other type of notations that convey a request in a method that is understandable by the sender. For example, a customer sends an order for flowers to be delivered to a particular address using a notation of the letter "S" to designate the "South". The receiver on the end may not interpret this correctly and the flowers are sent to an incorrect address. Another practice in electronic text messaging based systems is not providing complete information. For example, a customer sends an order for food items to be delivered to a desired location and the customer omits sending a postal code or city. The ordering system may not be able to complete the order correctly without the missing information.

Other methods involving ordering services or goods involve transferring the funds during the ordering process to a third party intermediary. For example, when ordering a food item, the customer will be billed by their mobile phone carrier for the price of the item. The provider then must have an account with the carrier and collect the funds from said carrier. Using a third party creates a drawback by requiring an extra step in the transaction and creating the potential for complications if an order is not processed correctly.

Prior ordering techniques have many short comings. The present invention addresses many of these short comings to provide an improved system for purchasing goods and services.

BRIEF SUMMARY OF THE INVENTION

The present invention provides a computer system and method for facilitating a transaction between a buyer and a seller. The seller is one of multiple available providers of a product and/or service. Initially, the buyer sends out an order, and the order is automatically verified. A seller is then determined based on at least one desirable characteristic of that particular seller. Then, the order is automatically translated into a format understandable by the desired seller. The order is communicated to the desired seller and the status of the order is later communicated to the buyer.

DETAILED DESCRIPTION OF THE INVENTION

Figure 1:
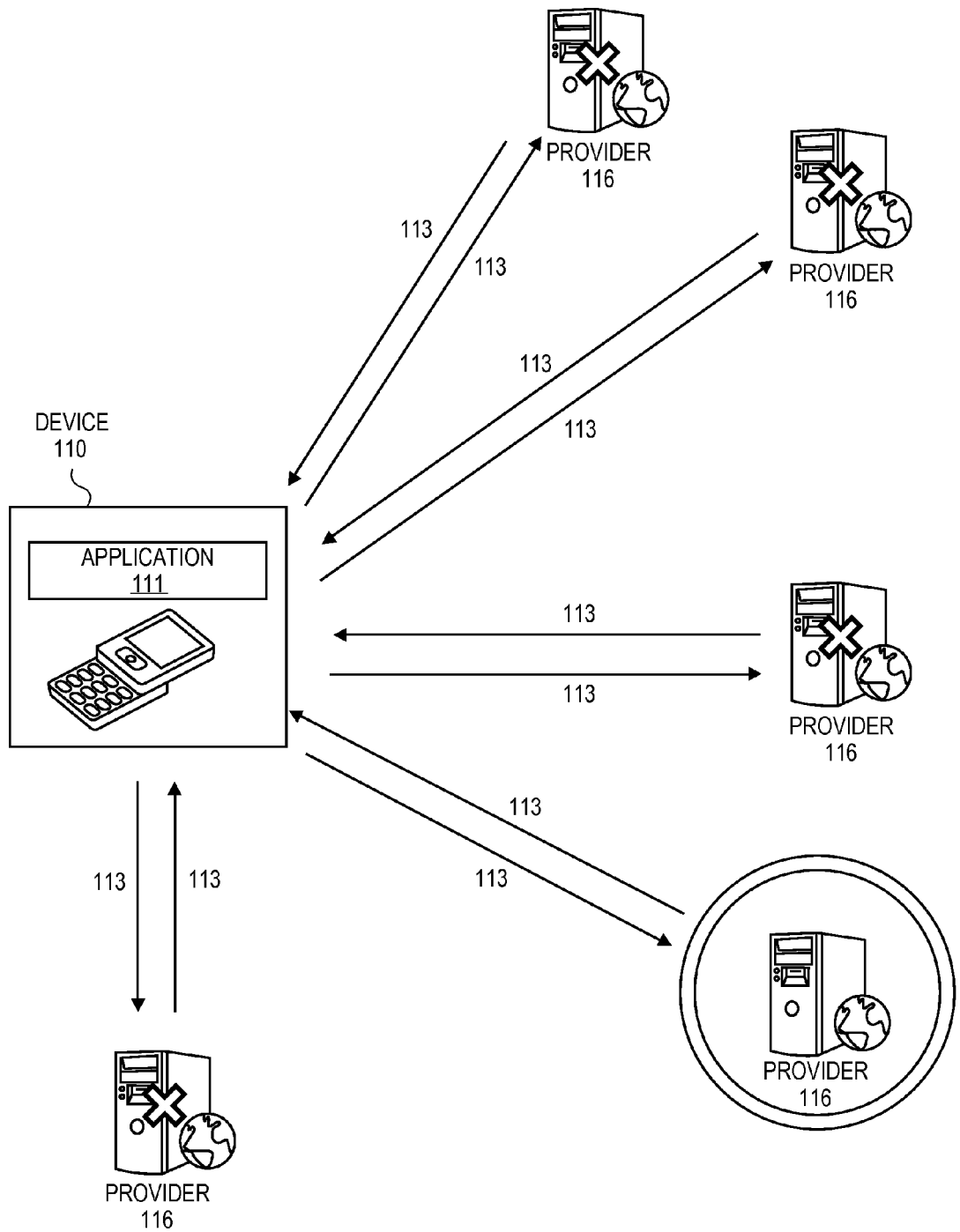
FIG. 1 Illustrates a representative system of the prior art.

FIG. 1 Illustrates a representative system of the prior art. The system includes a device 110 running an application 111. Device 110 may be a mobile phone or other computer device or system. Application 111 may be an SMS application, or Web browser.

Device 110 transmits information over a communication channel 113 to a provider 116. Communication channel 113 may be an SMS gateway or Internet connection. Provider 116 may be a vendor who provides a service or a product.

In a typical embodiment of the prior art, a user would send a message on application 111 of device 110 over communication channel 113 to each individual provider 116. This would involve sending and receiving messages through the system to each provider until a single provider is able to meet the user's needs.

Figure 2:
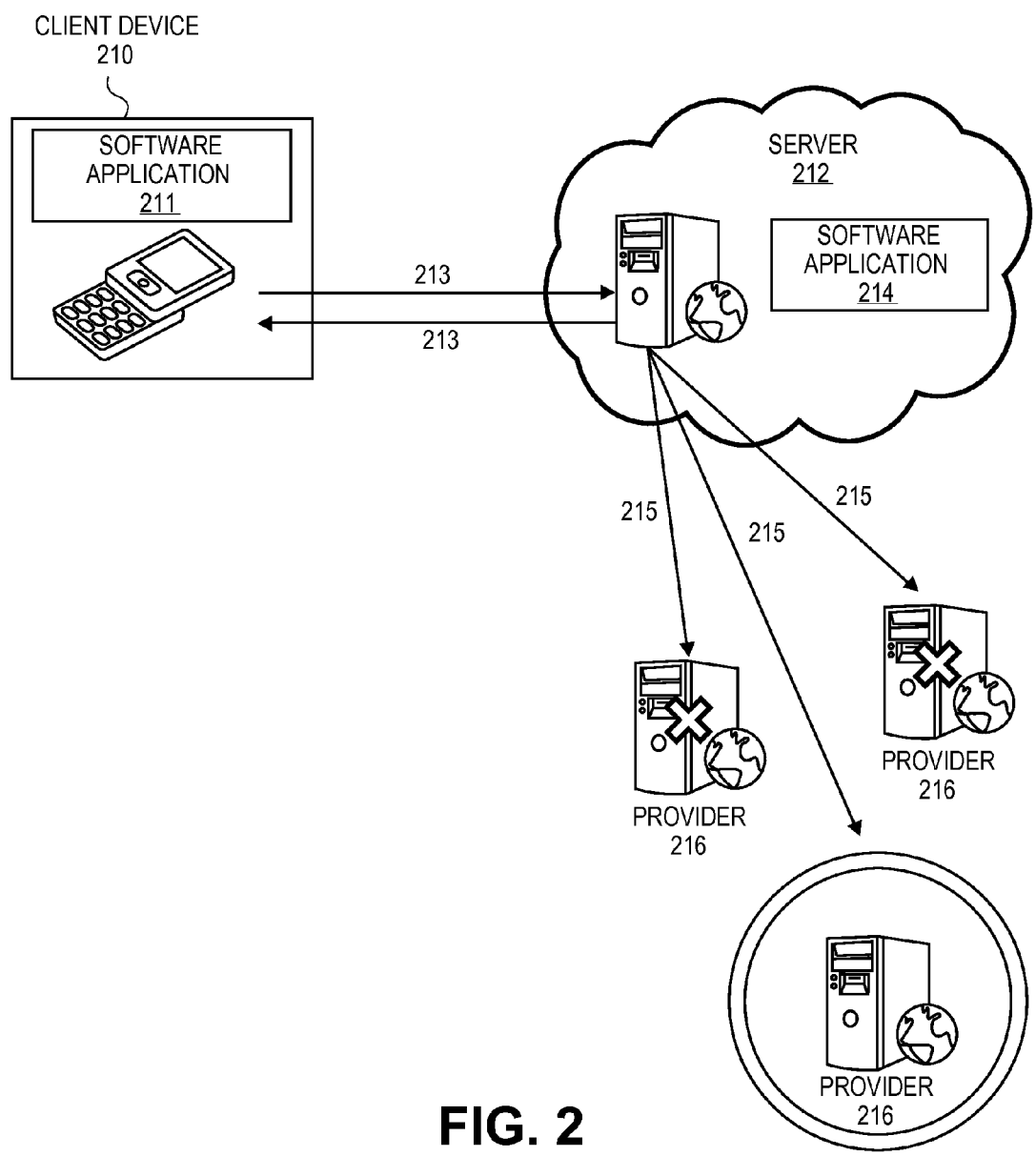
FIG. 2 Illustrates one embodiment of the present invention.

FIG. 2 Illustrates a representative system in which the preset invention may be implemented. The system includes a client device 210, running a software application 211, connected to a server 212 via a communication channel 213. Client device 210 may be, for example, a computer, iPhone, Blackberry, PDA, or a mobile phone running software application 211 such as an SMS application, a text messaging application, a web browser, a wap browser, a Brew applet, a Java applet, an email application, a blackberry application, an iPhone application, a Google android application, or other known methods of sending electronic messages. Communication channel 213 may be an SMS, an Email, or a Data gateway. It may alternatively comprise an Internet connection or other known connection methods. Server 212 may be a computer or processor operating software application 214.

Server 212 will be connected with client device 210, and one or more providers 216 via communication channels 215. Providers 216 may be vendors who provide services or products. The provider may be a service such as a taxi, transportation, or towing service and a product such as food, beverages, flowers, entertainment, and general consumer goods. The provider can also provide any other commercially available service or product. Providers 216 utilize devices to electronically receive order information. For example, a computer, iPhone, Blackberry, PDA, or a mobile phone running software a application such as an SMS application, a text messaging application, a web browser, a wap browser, a Brew applet, a Java applet, an email application, a blackberry application, an iPhone application, a Google android application, or other known methods of sending and receiving electronic messages may be utilized by provides 216 to receive messages related to buyer orders. Communication channel 215 may be an internet connection or other known connection methods.

In one embodiment, software application 214 will be a program which may be implemented as follows. First, it may verify the user's eligibility to order. If a customer is ineligible to order, and there are no suitable providers 216 participating, or if the order cannot be accepted by a provider, a message is sent to the user indicating that the order cannot be completed. If the order information cannot be recognized, is incomplete, or needs clarification, the system will communicate with the user over communication channel 213, to client device 210, asking for an input on software application 211 to confirm the order information or resend in a proper format.

Second, in one embodiment, software application 214 will interpret/validate the order information. Third, it may check for suitable participating providers 216 for fulfillment. Fourth, it may automatically select a provider based on its ability to fulfill, geographic proximity to the user, and/or estimated time for order fulfillment by obtaining information from providers 216 over connection channel 215. Other selection criteria may be used. Fifth, it may reformat the order data as necessary so that the provider's native electronic ordering system can recognize it. Sixth, it may attempt to establish a connection with the provider by communicating over communication channel 215 and attempt to queue an order with the selected provider. Finally, if the order is successfully queued, it may send a confirmation message to client device 210, for software application 211, via communication channel 213 and the order will be fulfilled by the selected provider. This implementation is one method for the present invention, however variations and steps may be adjusted accordingly. The user may then obtain the status of the order or cancel the order by using client device 210 with software application 211 through communication channel 213 with server 212 running software application 214 connected to provider 216 over communication channel 215.

Figure 3:
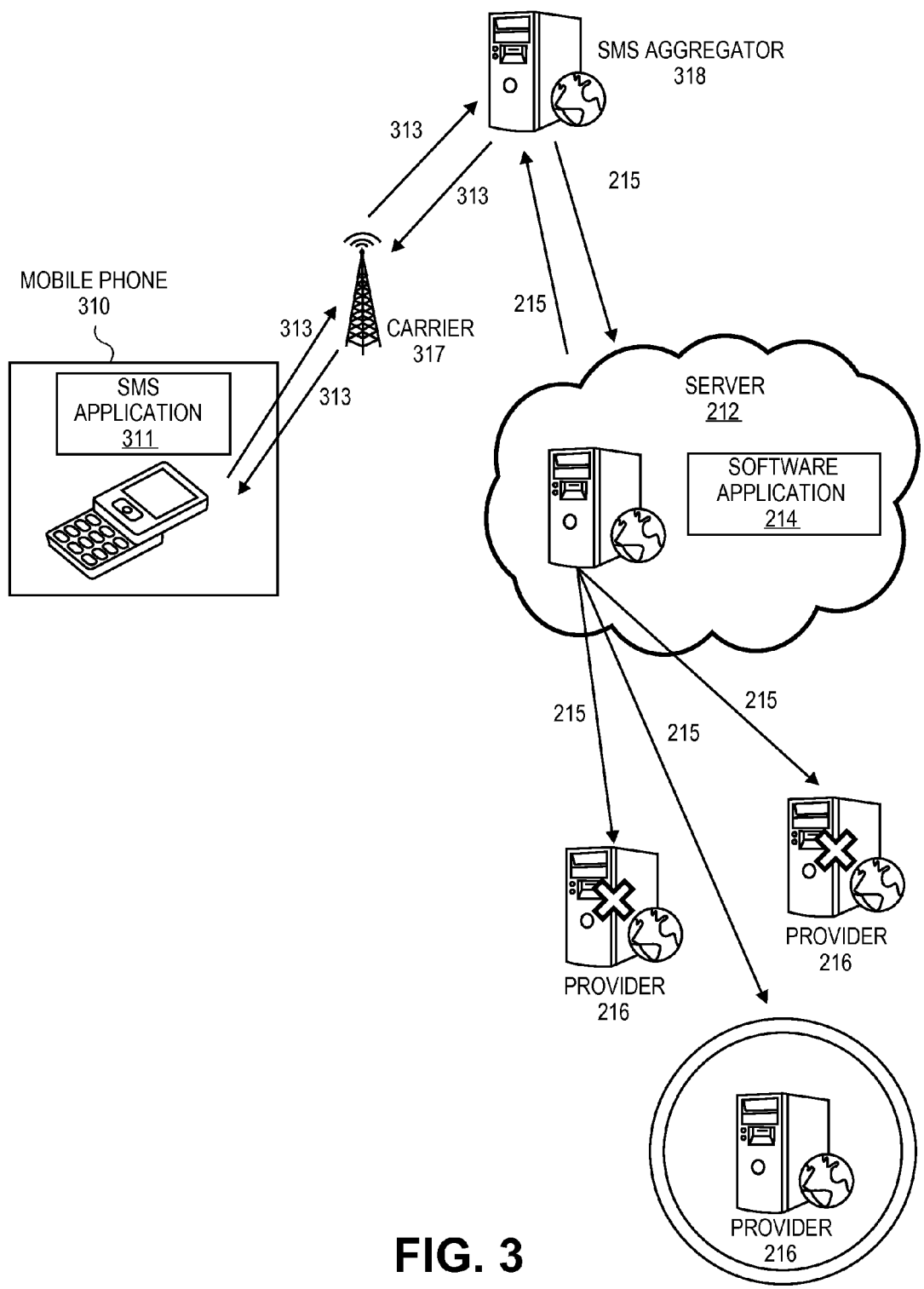
FIG. 3 Illustrates a second embodiment of the present invention.

FIG. 3 illustrates a second embodiment for selecting a provider using an SMS message from a mobile phone. A mobile phone 310 with an SMS application 311 sends a message to a carrier 317 over an SMS gateway 313. Carrier 317 then relays the message to a SMS aggregator 318 over similar SMS gateway 313. The SMS aggregator then communicates the message over a communication channel 215 to server 212. Communication channel 215 may be the internet between SMS aggregator 318 and server 212, and communication channel 215 may also be another network, such as a wireless network, between software application 214 and provider 216 during a single transaction. Other commercially available media for electronic communication may be used for communication channel 215.

Next, Server 212 operates as previously stated using software application 214 with communication channel 215, SMS aggregator 318, communication channel 313, and carrier 317 to interface with mobile device 310 instead of using communication channel 213 and client device 210 as shown in FIG. 2. The software application selects desired provider 216 using communication channel 215.

Mobile phone 310 can be any device capable of communicating messages over mobile phone networks including a PDA, an iPhone, a Blackberry or a Google Android device. SMS application 311 can be any application capable of sending SMS text messages over mobile networks or the Internet. Carrier 317 is any mobile phone carrier including CDMA, IDEN, GSM, TDMA, UMTS, WIMAX, LTE and future mobile phone based networks. SMS aggregator 318 converts SMS messages received to a format understandable and transmittable over communication channel 215. SMS aggregator 318 can also convert messages received over communication channel 215 into SMS messages to be sent over SMS gateway 313.

Figure 4:
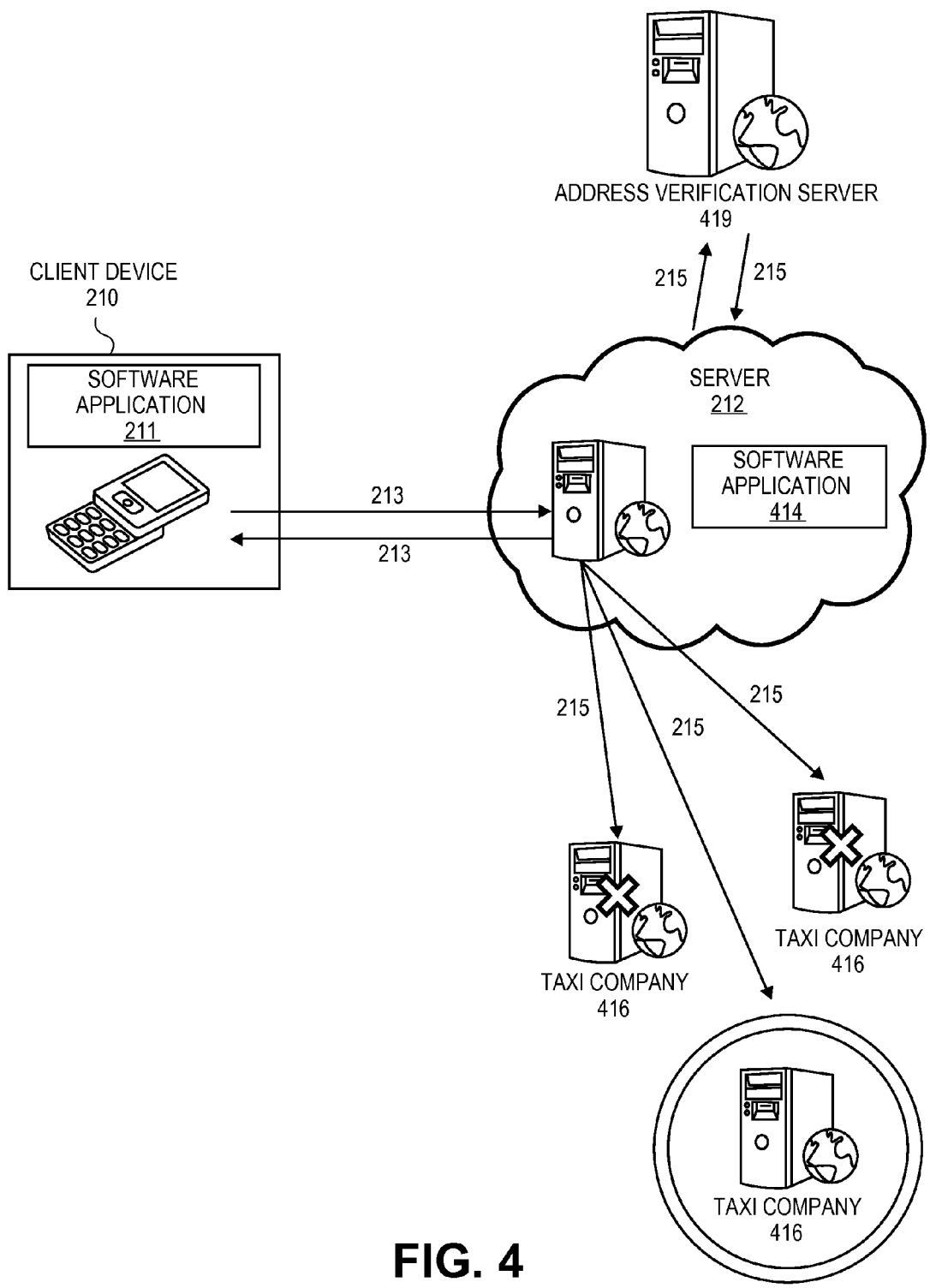
FIG. 4 Illustrates a third embodiment of the present invention.

FIG. 4 illustrates a third embodiment where the provider is a taxi company. Mobile phone 210 with software application 211 communicates to server 212 via communication channel 213. Server 212 uses a software application 414 and communicates with an address verification server 419 via communication channel 215. Server 212 also communicates with providers 416 via communication channel 215.

In one embodiment, software application 414 operates first by verifying the user's eligibility to order. If a customer is ineligible to order, and there are no suitable taxi companies 416 participating, or if the order cannot be accepted by a taxi company, a message is sent to the user indicating that the order cannot be completed. If the order information cannot be recognized, is incomplete, or needs clarification, the system will communicate with the user over communication channel 213, to client device 210, asking for an input on software application 211 to confirm the order information or resend in a proper format. Second, the software application may parse the message contents to obtain any keywords such as the address and unit number. Third, it may check if that address is valid using address verification server 419 over communication channel 215. Address verification server 419 can be an external or online module which verifies the accuracy of addresses such as Google Maps, NAVTEQ, or Mapquest. Fourth, it may check for suitable participating taxi companies 416 for fulfillment. Fifth, it may automatically select a taxi company based on car availability, geographic proximity to the user, and/or estimated time for fulfillment. Other selection criteria may be used. Sixth, it may reformat the order data as necessary so that the taxi company's native electronic ordering system can recognize it. Seventh, it may attempt to establish a connection with the provider by communicating over communication channel 215 and attempt to queue an order with the taxi company. Finally, if the order is successfully queued, it may send a confirmation message to client device 210, for software application 211, via communication channel 213 and the order will be fulfilled by the taxi company. This implementation is one method for the present invention, however variations and steps may be adjusted accordingly. The user may then obtain the status of the order or cancel the order by using client device 210 with software application 211 through communication channel 213 with server 412 running software application 414 connected to provider 416 over communication channel 215.

Figure 5:
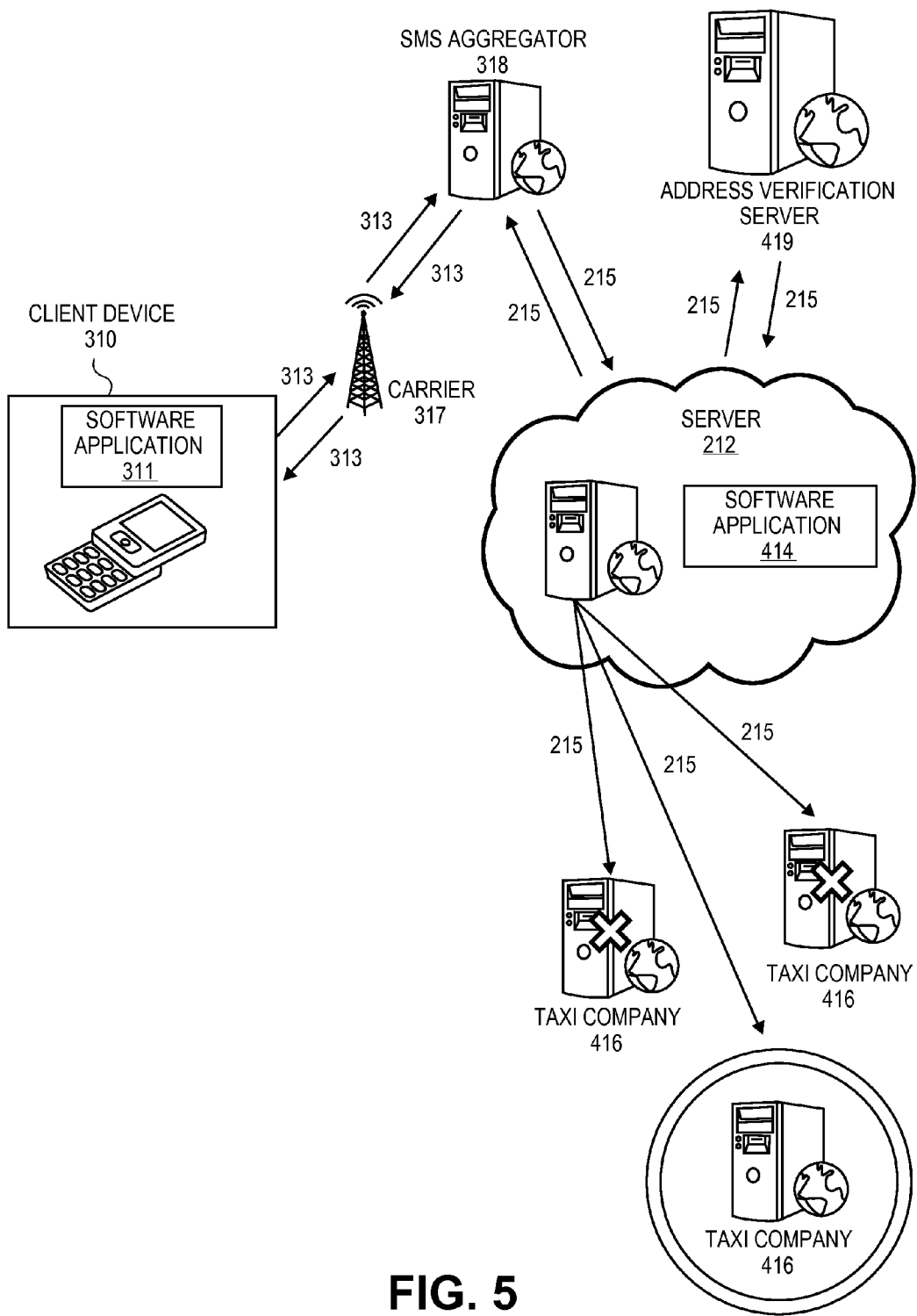
FIG. 5 Illustrates a fourth embodiment of the present invention.

FIG. 5 illustrates a fourth embodiment for selecting a taxi over SMS from a mobile phone. Mobile phone 310 with SMS application 311 sends a message to carrier 317 over SMS gateway 313. Carrier 317 then relays the message to SMS aggregator 318 over similar SMS gateway 313. SMS aggregator 318 then communicates the message over communication channel 215 to server 212. Server 212 then operates as previously stated using software application 414 with communication channel 215, SMS aggregator 318, communication channel 313, and carrier 317 to interface with mobile device 310 instead of using communication channel 213 and client device 210 as shown in FIG. 2. Software application 414 selects desired taxi company 416 using communication channel 215.

Figure 6:
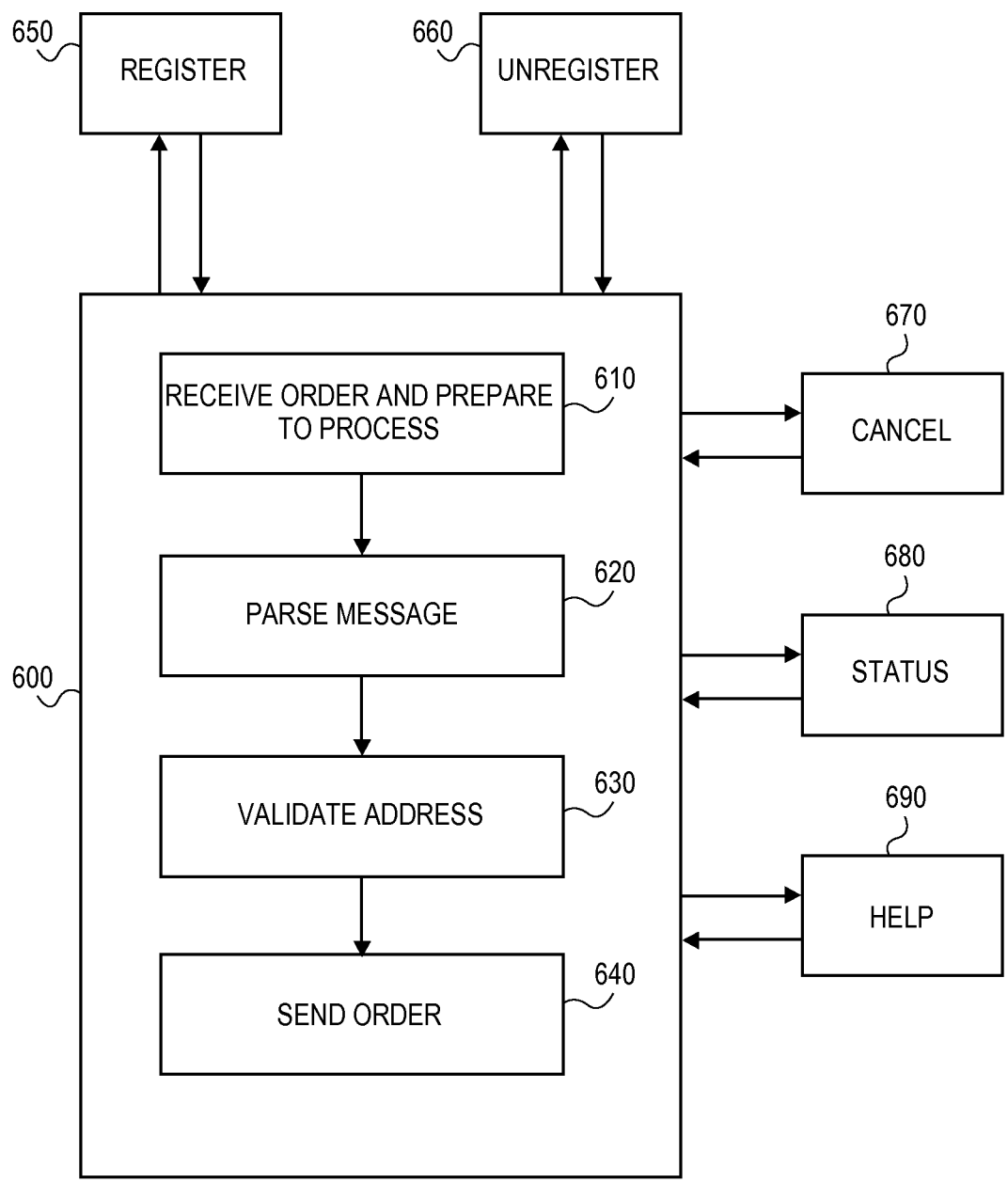
FIG. 6 Illustrates a modular, high-level design of the process of the present invention.

Turning now to the process flowcharts for the present invention, FIG. 6 shows a modular, high-level design of the overall process. The following process applies to the ordering of a taxi, however this process can be used for any other provider for a service or product with slight modifications.

The first component of the overall process 600 is a Receive Order and Prepare to Process module 610. The second component is a Parse Message module 620. The third component is a Validate Address module 630. The final component is a Send Order module 640. Together, they provide the overall step-by-step process provided by the present invention.

Overall process 600 is also connected to five optional modules. These modules can be used at any time by the user but are not required for the operation of overall process 600. The first optional module is a register module 650. This module allows for the user to pre-register for the system. This may allow such benefits as pre-stored information and other preferences. For example, a user may want to pre-register with a food provider so that a menu item is delivered when an order is placed. The second module is a unregister module 660. This always a user to remove pre-registered information including settings. The third module is a cancel module 670. This module allows the user to cancel an order at any time during and after the process has begun. The fourth module is a status module 680. This module allows the user to obtain status information on an order in progress. The fifth module is a help module 690. This module allows the user to obtain information from the system on commands which can be used. This module may also help the user if they are in need of any assistance with the system.

Figure 7:
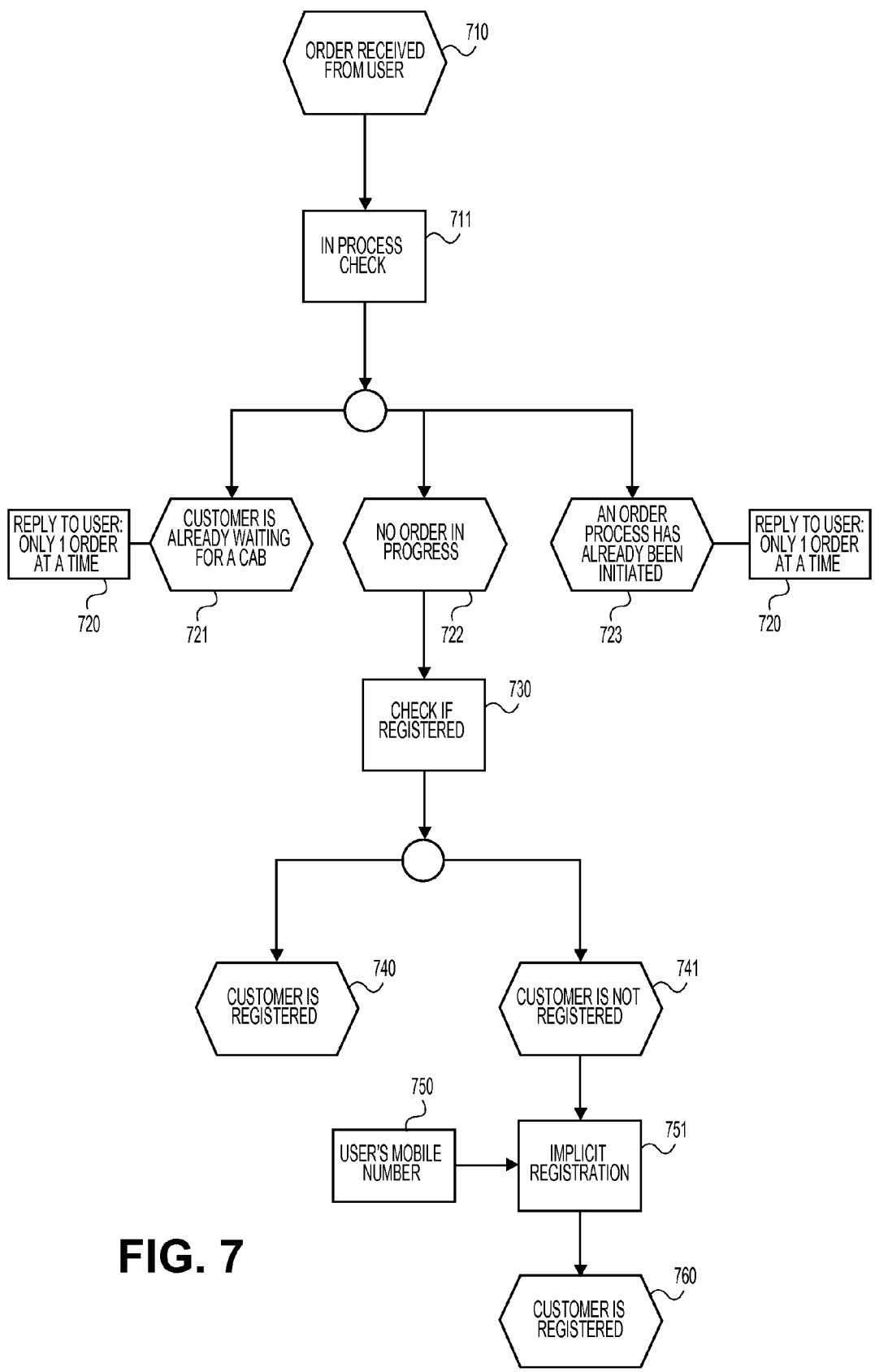
FIG. 7 Illustrates the Receive order and Prepare to Process module of the present invention.

FIG. 7 further illustrates Receive Order and Prepare to Process module 610. The first step of this process starts with the order received from a user as shown in step 710. At step 711, the system will check if an order is already in process. If the customer is already waiting for a good or service (e.g., a taxicab) at step 721 or an order has already been initiated at step 723, then the system will reply to the user with a message such as "Only 1 order at a time" at step 720. If there is no order in progress at step 722, the system will continue on to the next step 730.

At step 730, the system will check if the user is previously registered. If the customer is registered at step 740, the process of this module will be complete. If the customer is not registered at step 741, the system will implicitly register the user at step 751 by taking the user's mobile phone number at step 750. The customer is now registered at step 760 and the process of this module is complete.

Figure 8:
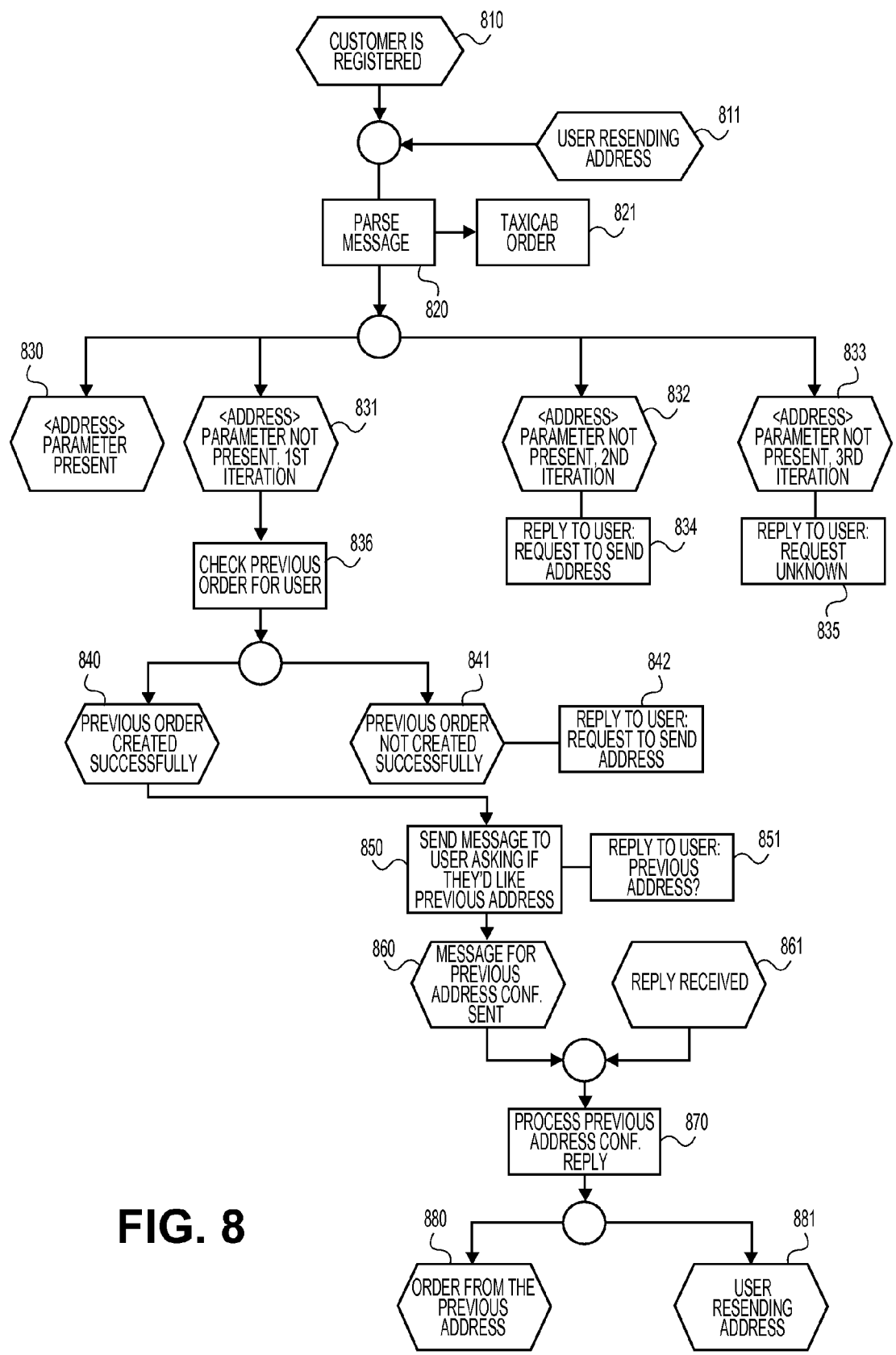
FIG. 8 Illustrates the Parse Message module of the present invention.

Continuing on from FIG. 7, FIG. 8 further illustrates Parse Message module 620. At Step 810, the customer is registered and the system will use the address originally sent, or at step 811, the system will use a resent address. At step 820, the system will parse the message to figure out what type of order is being sent. In this example process, the order is a taxicab order as shown in step 821.

Also during parse message at step 820, the system will check to see if an address parameter is present. If the address is present at step 830, the process of this module will be complete. If the parameter is not present, it will then depend on the number of iterations the system has parsed the address with no address present. If it is the second iteration at step 832, the system will send a reply to the user with a message such as "Request to send address" at step 834 and the process will start over at user sending address at step 811 when the address is received. If it is the third iteration at step 833, the system will reply to the user with a message such as "Request Unknown" at step 838 and the process of this module will be complete with no order being processed.

If parse message at step 820 is on its first iteration with no address present at step 831, the system will check for previous orders for that user at step 836. If there is no previous order at step 841, the system will reply to the user with a message such as "request to send address" at step 842 and the process will start over at user sending address at step 811 on its second iteration. If there is a previous order at step 840, the system will send a message to the user asking if they would like to use the previous address at step 850 with a message such as "Previous Address?" at step 851.

Continuing to the next step 870, the system will process the previous address as long as both a message for the previous address confirmation has been sent at step 860 and a reply from the user has been received at step 861. The system will then complete the process in this module using the previous address at step 880, or it will ask the user to resend the address at step 881 and the process will start over at the user sending an address at step 811 on its second iteration.

Figure 9:
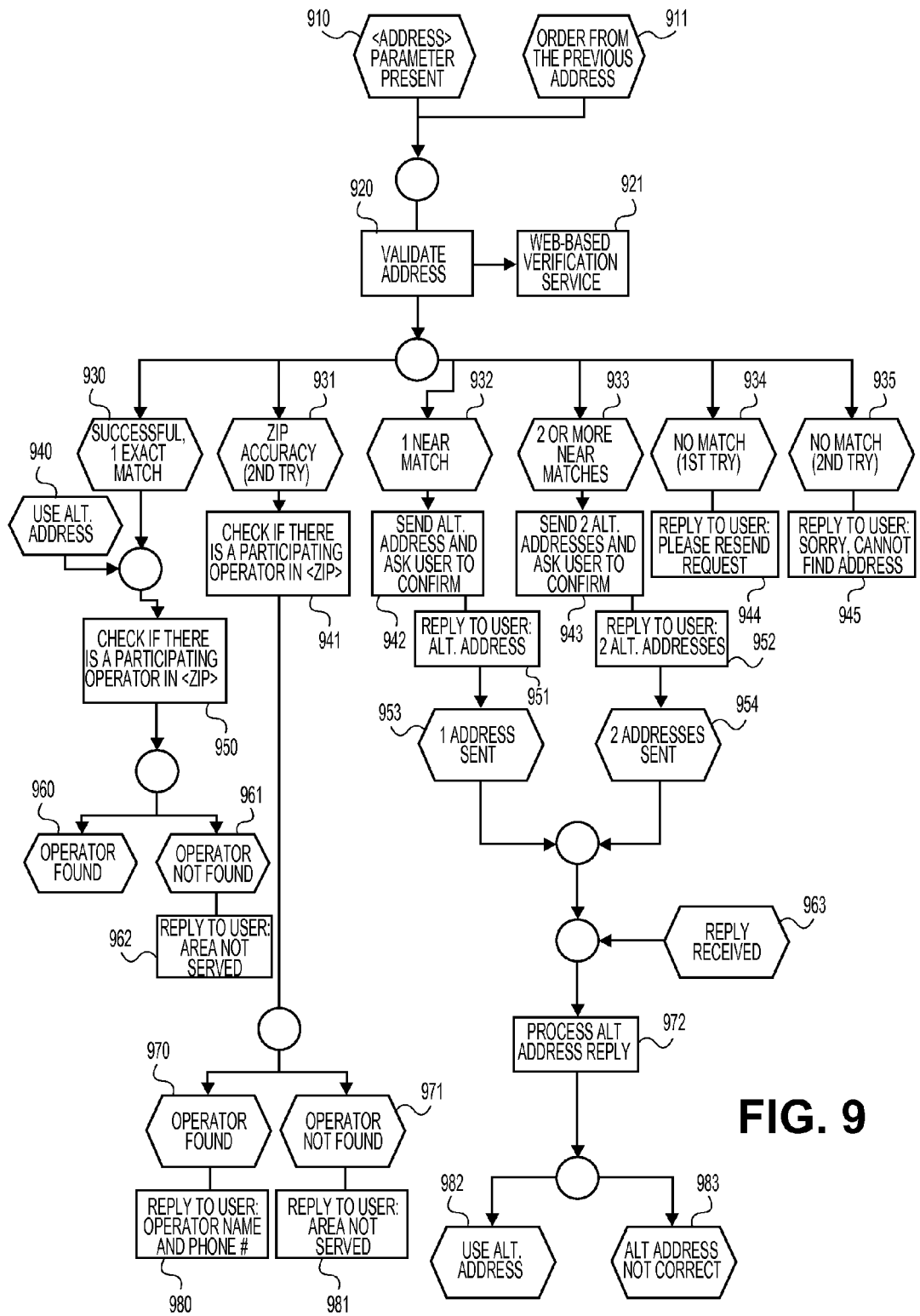
FIG. 9 Illustrates the Validate Address module of the present invention.

FIG. 9 further illustrates Validate address module 630. Continuing on from FIG. 8, the address will either be from what was submitted at step 910, or from a previous address at step 911. This address will be validated at step 920. The method of validation being used in this example is a web-based verification service shown in step 921. The web-based verification service may be a mapping tool provided by systems such as Google Maps, NAVTEQ, or Mapquest. Other commercially available systems may be used for address verification. The next step in the process will depend on the validity of the address.

If the validation was successful and there is exactly one match at step 930, the system will use the address as received or an alternative address at step 940 that is the same. The system will then check to see if there is a participating operator in that area at step 950. If no operator is found at step 961, the system will reply to the user with a message such as "Area not served" at step 962 and the process will be completed with no order possible. If an operator is found at step 960, the module is complete.

If the validated address process at step 920 only finds zip code accuracy at step 931, the system will check if there is a participating operator in the area at step 941. If there is no operator at step 971, the system will reply to the user with a message such as "Area not served" at step 981 and the process will be completed with no order possible. If there is an operator found at step 970, the system will reply to the user by providing the operator name and phone number at step 980 and the process will be completed with no order possible.

If the validated address process at step 920 finds one near match at step 932, the system will send an alternative address and ask the user to confirm at step 942. The reply will state, for example, "Alt. Address" with the alternative address provided at step 951. The system will then send one address at step 953 to the user. Once the address is sent and the user has responded at step 963, the system will process the alternative address reply at step 972. If the user states the alternative address is incorrect at step 983, the process will be completed with no order possible. If the user states the alternative address is correct, it will use the alternative address at step 982 and use the process under alternative address at step 940 to complete the process of this module as stated previously.

If the validated address process at step 920 finds two or more near matches at step 933, the system will send alternative address and ask the user to confirm at step 943. The reply will state, for example, "Alt. Addresses" with the alternative addresses provided at step 952. The system will then send two addresses to the user at step 954. Once addresses are sent and the user has responded at step 963, the system will process the alternative address reply at step 972 to complete the module as stated previously.

If the validated address process at step 920 finds no match on the first attempt at step 934, it will reply to user with a message such as "Please Resend request" at step 944. If the validated address process at step 920 finds no match on its second attempt at step 935, it will reply to user with a message such as "Sorry, cannot find address" at step 945 and the process will be completed with no order possible.

Figure 10:
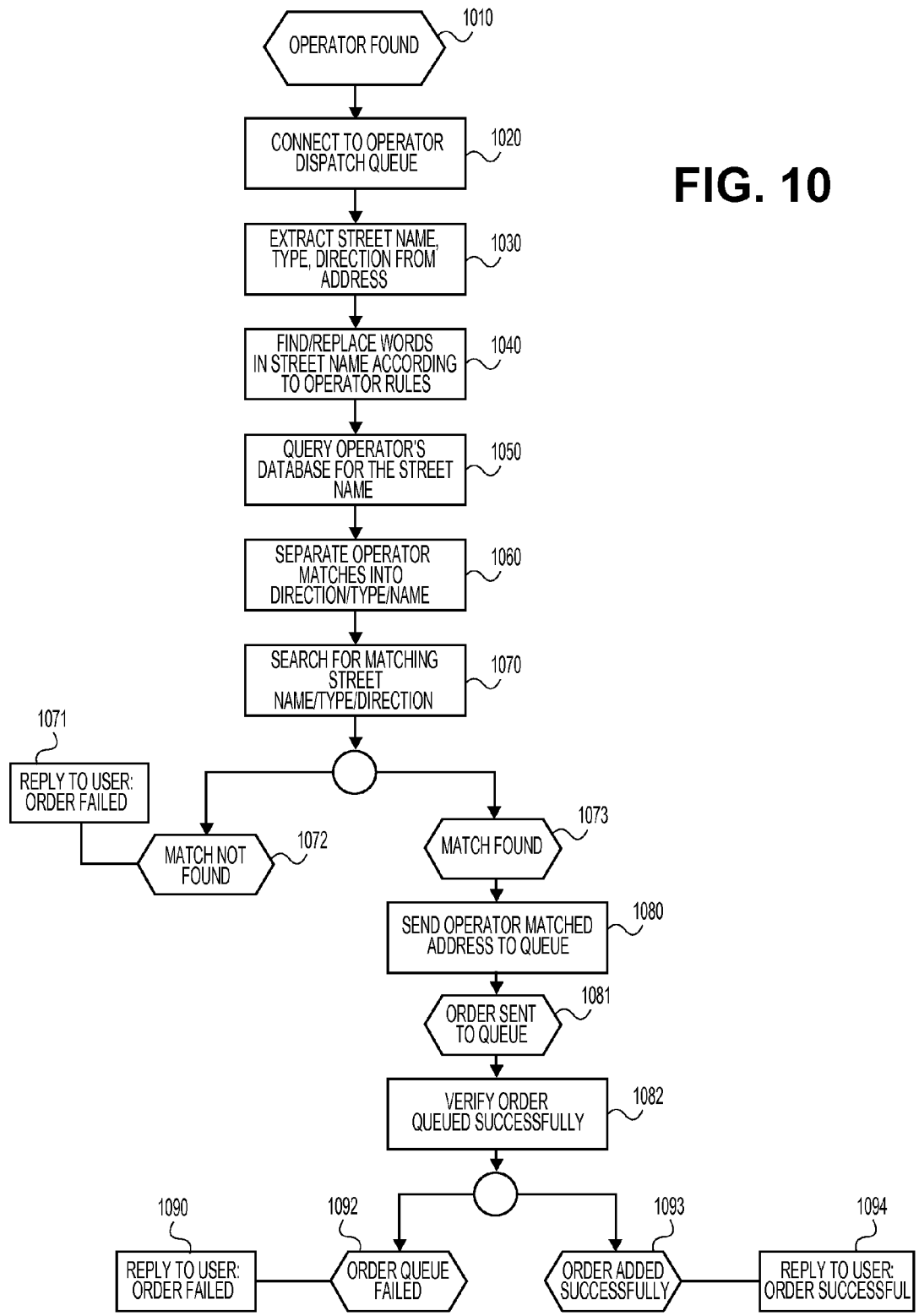
FIG. 10 Illustrates the Send Order module of the present invention.

FIG. 10 further illustrates Send Order module 640. Continuing on from FIG. 9, at step 1010, the operator is found. At step 1020, the system will connect to the operator queue. At step 1030, the system will extract the street name, type, and direction from the address. At step 1040, the system will find/replace words in street names according to the particular operator's rules. At step 1050, the system will query the operator's databases for the street name. At step 1060, the system will separate the operator matches into direction, type, and name. At step 1070, the system will search for matching street, type, and name.

If a match is not found at step 1072, the system will reply to the user with a message such as "Order Failed". The process will be complete with no order possible.

If a match is found at step 1073, the system will send the operator a matched address to queue at step 1080. The system will then send the order to queue at step 1081 and verify that it was queued successfully at step 1082. If the order failed at step 1092, the system will send a message to the user that the order failed at step 1090 and the process will be complete with no order possible. If the order is added successfully at step 1093, the system will send a message to the user that the order was successful at step 1094 and the process of this module as well as the entire process will be complete with a completed order.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

The invention claimed is:

1. A system for intelligent ordering comprising:
   a storage device storing a program;
   a computer operative with the program to:
   a) receive, by the computer, from an electronic device of a user (i) a request for an order comprising order information and (ii) an electronically determined location of the user;
   b) translate, by the computer, the request into a form understandable by the computer;

c) abbreviate, by the computer, future orders based on past orders of the user;
d) verify, by the computer without user interaction, whether the request is valid;
e) determine, by the computer, a provider from multiple providers capable of fulfilling the order, the provider having characteristics, wherein one of the characteristics is proximity of the user to the provider based on the electronically determined location of the user, and wherein the provider provides taxi, transportation, delivery, or towing services;
f) translate, by the computer, the request into a form understandable by a device of the provider; and
g) provide, by the computer, the request to the device of the provider.

2. The system for intelligent ordering of claim 1, wherein the computer is operative with the program to charge the user a fee.

3. The system for intelligent ordering of claim 1, wherein the computer is operative with the program to provide the electronically determined location of the user to the device of the provider.

4. The system for intelligent ordering of claim 1, wherein the request is provided to the device of the provider by inserting the request into an ordering queue of the provider.

5. The system for intelligent ordering of claim 1, wherein the computer is operative with the program to provide verification through additional communication with the user.

6. The system for intelligent ordering of claim 1, wherein the computer is operative with the program to enable the user to cancel the request.

7. The system for intelligent ordering of claim 1, wherein the computer is operative with the program to enable the user to obtain a status of the order.

8. The system for intelligent ordering of claim 1, wherein the request includes an address, and wherein the address is optionally based on a GPS determined location of the user.

9. The system for intelligent ordering of claim 1, wherein the provider is determined based on at least one of a geographic proximity to the user and an estimated time for fulfillment of the order.

10. The system for intelligent ordering of claim 1, wherein the computer operative with the program to verify whether the request is valid includes detecting repetitive requests.

11. A method of using a computer for intelligent ordering comprising:
receiving, by the computer, (i) a request for an order from an electronic device of a user comprising order information and (ii) an electronically determined location of the user;
abbreviating, by the computer, future orders based on past orders of the user;
verifying, by the computer without user interaction, the validity of the request;
identifying, by the computer, a provider from multiple providers based on characteristics of the provider, wherein one of the characteristics is proximity of the user to the provider based on the electronically determined location of the user, and wherein the provider provides taxi, transportation, delivery, or towing services;
translating, by the computer, the request into a form understandable by a device of the provider; and
providing, by the computer, the request to the device of the provider.

12. The method of using a computer for intelligent ordering of claim 11, further comprising charging the user a fee.

13. The method of using a computer for intelligent ordering of claim 11, further comprising cancelling the request.

14. The method of using a computer for intelligent ordering of claim 11, further comprising obtaining a status of the order.

15. The method of using a computer for intelligent ordering of claim 11, further comprising providing the electronically determined location of the user to the device of the provider.

16. The method of using a computer for intelligent ordering of claim 11, further comprising providing the request to the device of the provider by inserting the request into an ordering queue of the provider.

17. The method of using a computer for intelligent ordering of claim 11, further comprising verifying through additional communication with the user.

18. The method of using a computer for intelligent ordering of claim 11, further comprising allowing the user to cancel the request.

* * * * *